A. G. E. HULTGREN.
ANTIFRICTION BEARING.
APPLICATION FILED MAY 14, 1920.

1,369,031.

Patented Feb. 22, 1921.

Inventor
Axel G.E.Hultgren
By his Attorneys
Rogers, Kennedy Campbell

UNITED STATES PATENT OFFICE.

AXEL GUSTAF EMANUEL HULTGREN, OF GOTTENBORG, SWEDEN, ASSIGNOR TO AKTIEBOLAGET SVENSKA KULLAGERFABRIKEN, A CORPORATION OF SWEDEN.

ANTIFRICTION-BEARING.

1,369,031.  Specification of Letters Patent.  Patented Feb. 22, 1921.

Application filed May 18, 1920. Serial No. 382,444.

*To all whom it may concern:*

Be it known that I, AXEL GUSTAF EMANUEL HULTGREN, a subject of the King of Sweden, residing at Gottenborg, Sweden, have invented certain new and useful Improvements in Antifriction-Bearings, of which the following is a specification, reference being had therein to the accompanying drawing.

This invention relates to anti-friction bearings, and has for an object to provide a bearing having an improved roller construction. The invention also relates to a roller bearing having balls or rollers possessing greater elasticity than those now in use, and more specifically to such a bearing having a series of hollow rolling elements between or upon races or tracks, each of such rolling elements having a continuous integral seamless race engaging zone adapted to contact with the races, usually formed on rings, and being so held by means of some suitable retaining device that its strongest and most uniformly elastic zone will, at all times, be presented to the associated races.

It is a well known fact that the hollow balls heretofore suggested for employment in anti-friction bearings had portions which were weaker than the major part of the ball, in some instances the balls had a seam where two halves were united together, which seam was of less strength and of a different degree of flexibility and elasticity than the adjacent portions of the ball. Such disparity of elasticity obviously causes an erratic movement of the supported parts, and also subjects the parts of the bearing, particularly the balls, to uneven and unequal distribution of load which, of course, destroys the balls and shortens the life of the bearing. The metal at the seam is exposed to repeated stresses. If this seam was formed by welding, strong as such seams are when subjected to pure tension, the stresses quickly result in the formation of fatigue cracks, the incident flaking starting at the seam. According to my invention the balls are formed with a circumferential portion located medially of the ends, and at or in the region of the equator, assuming such ends to be the poles, which is of uniform strength and elasticity throughout, and the balls are of such construction that throughout the series of balls this circumferential track engaging portion is of uniform strength and elasticity.

In the drawings accompanying this specification an illustrative embodiment of the invention is shown, in which drawings.

Figure 1:
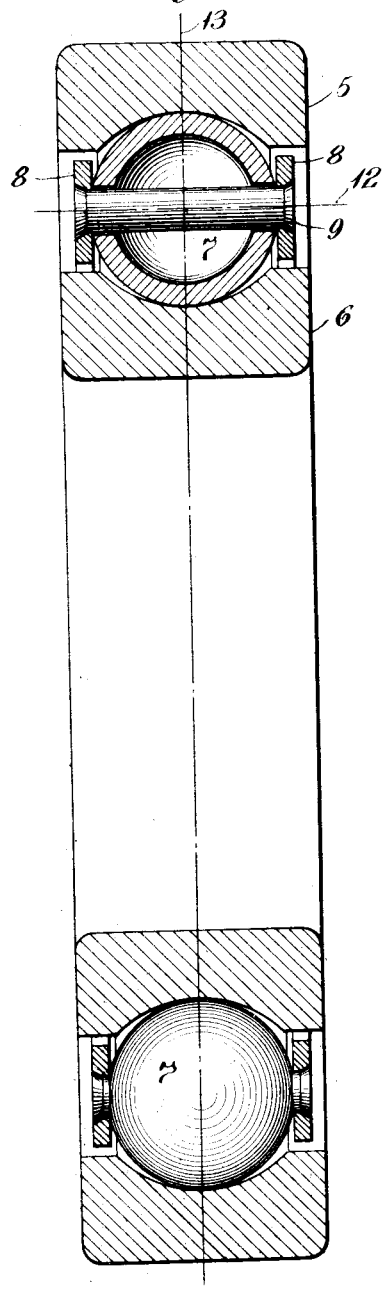
Figure 1 represents a form of my improved anti-friction bearing in axial section, one roller or ball being shown in axial section and one in elevation.

The bearing illustrated comprises an outer ring 5, and an inner ring 6 of the deep groove type. Hollow rollers 7 are shown disposed in the race grooves between the rings and held in position by a suitable retainer which in the illustration comprises a pair of plates 8—8. The retainer has suitable projections or studs, in the present illustration rivets 9, engaging the sockets 10 located at the poles of the balls 7. The walls surrounding the openings at the poles constitute retainer sockets in the particular construction illustrated.

Figure 2:
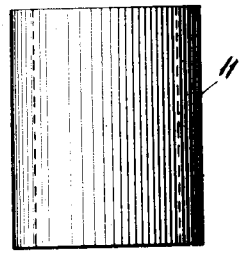
Fig. 2 is an elevation of a blank from which the rollers may be made.
Figure 3:
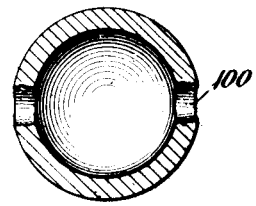
Fig. 3 shows in axial section one of the rollers in course of construction.
Figure 4:
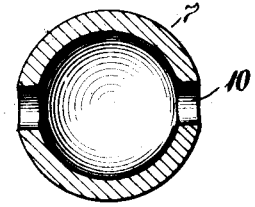
Fig. 4 is a similar view of a completed roller.

The form of hollow ball herein illustrated is made by some well known or convenient method, one mode being the formation of the ball from a section of seamless tubing, such a section being represented at 11 in Fig. 2. The blank 11 is formed into the roller by means of proper dies in a well known manner. Upon leaving the dies the portion of the ball formed from the ends of the blank will present, at times, an irregular outline at the portions surrounding the openings 100. This material is removed, as for instance, by drilling, boring, or grinding so that plane walled sockets are formed. If in the turning in of the ends of the blank the walls of the roller are given unequal thickness this boring operation removes certain of the portions of unequal thickness. Whatever thickening of the walls laterally of the track zone is present is substantially uniform and symmetrical and therefore does not appreciably affect the uniform elasticity of the balls. In fact, such thickening, particularly at the regions of the sockets, in some instances, is found desirable. The outer surface of the ball is ground and polished in some suitable or well known manner. The resultant roller, in the present instance shown as a sphere 7, is formed with the openings 10, being a form of the sockets heretofore referred to for receiving the guide and support afforded by the retainer. Since the axis of rotation passes through these openings such sockets may conveniently be stated to be located at the poles of the sphere. The axis of rotation is indicated by the line 12 in Fig. 5. The line 13 in such figure represents a plane disposed medially of the sockets or the poles, and in which plane is located the equator of the sphere. The regions adjacent such equator, and upon opposite sides of the same, which for convenience may be referred to as the equatorial zone comprising a structure, the material of which is of substantially uniform thickness, strength and elasticity throughout, and which is integral and seamless. The point or line of contact between the roller and the race rings is located in this uniformly elastic equatorial zone. The retainer resists any tendency of the balls to change their rotating or spinning axis during their rotation around the race groove, and compels these balls to, at all times, present this most efficient portion to the track on the race rings, and to thereby support the load. The bearing, as thus constituted, presents a series of hollow balls, each of which has a zone of uniform strength and elasticity, and uniform with all its associates in such series whereby uniformity of load supporting capacity exists throughout the entire series.

Figure 5:
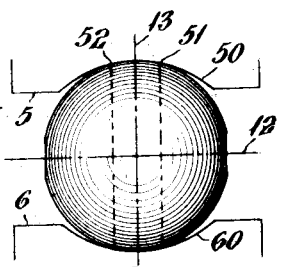
Fig. 5 is an elevation thereof accompanied by a diagrammatic representation of the race groove.

It would be rather difficult to empirically state how far laterally of the equator, indicated by the line 13 in Fig. 5, the region of uniformity of strength and elasticity extends. This depends upon the material from which the ball is made, the manner in which it is worked, its thickness, and the relative formation of the race ways upon which it travels. Assuming the curved lines 50 and 60 to represent the curvature of the race grooves there would be substantially a point contact between the ball and the grooves at the plane of the line 13 where this cuts the ball and the race rings. The yieldability and elasticity of the parts is normally such that under the amount of load which the bearing is designed to sustain the point contact will be somewhat extended laterally of these points of contact, and equally upon both sides thereof under pure radial load. For the purpose of illustration the track engaging zone of the ball may be assumed to lie approximately between the lines 51 and 52. In the commercial manufacture of my improved bearing the radius of curvature of the ball race groove is determined by the estimated radius of the curvature of the load carrying portion of the ball when under proper load. The relative proportioning of these radii determines the area of contact, upon the magniture of which area the amount of friction depends.

Although but one embodiment of the invention is shown in the drawing for the purpose of illustration it is apparent that changes may be made, when occasion demands, within the scope of the claims without departing from the spirit of the invention.

I claim as my invention:

1. An anti-friction bearing, comprising a pair of race rings and a series of hollow rolling elements therebetween, each of such rolling elements having a continuous integral race engaging zone and rounding ends provided with retainer sockets, and a retainer having pivots seated in said sockets for causing the said engaging zones to run upon the race rings.

2. An anti-friction bearing, comprising a pair of rings formed with ball races, a series of hollow balls in such races, each of the balls having a continuous, integral, elastic, load sustaining, equatorial zone and a retainer engaging the poles of each ball and causing it to engage the races at the said equatorial zone.

3. An anti-friction bearing comprising a pair of race rings, and a series of hollow rolling elements therebetween, each of such rolling elements having, at the region of its equator, a continuous, integral, race engaging zone, and rounding ends formed with retainer sockets, and a retainer having pivots seated in the said sockets for causing the roller to run upon the race rings at or in the region of its equator.

4. An anti-friction bearing comprising a pair of race rings and a series of hollow seamless balls each having retainer sockets at each of two opposite sides, and a retainer engaging the sockets for causing the portion of the ball disposed medially of the sockets to travel on the race tracks.

5. An anti-friction bearing comprising a pair of rings formed with ball races, a series of hollow balls in such races each of the balls having a seamless, integral zone of uniform elasticity throughout, all of the balls being of uniform elasticity and load carrying capacity and a retrainer engaging the balls and causing them to engage the races at the said zones.

In testimony whereof, I have affixed my signature hereto.

AXEL GUSTAF EMANUEL HULTGREN.